United States Patent Office 2,994,514
Patented Aug. 1, 1961

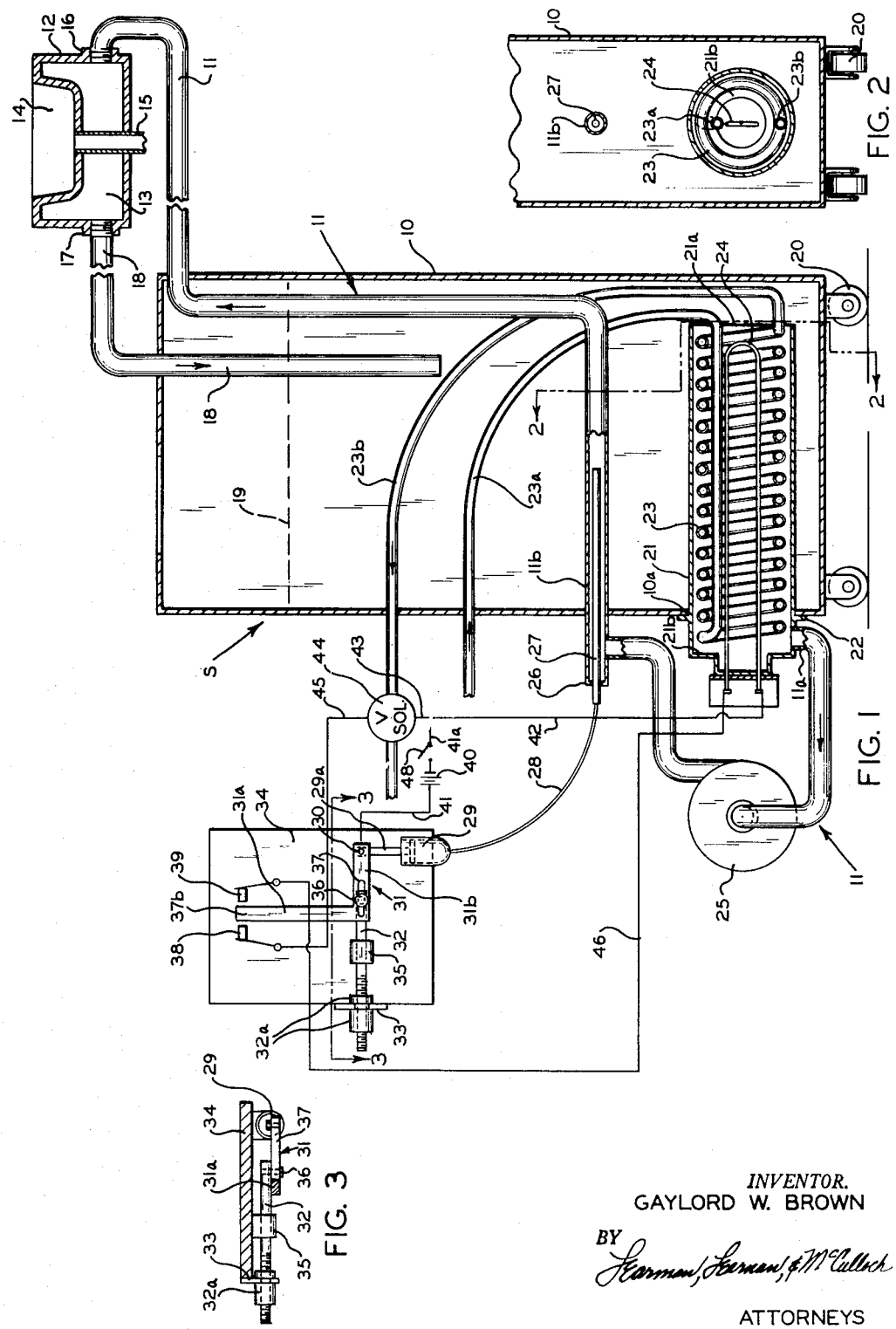

2,994,514
RECIRCULATING TEMPERATURE CONTROLLED FLUID SUPPLY SYSTEM
Gaylord W. Brown, 214 3rd St., Beaverton, Mich.
Filed Nov. 20, 1957, Ser. No. 697,687
10 Claims. (Cl. 257—287)

This invention relates particularly to recirculating temperature controlled fluid supply systems for plastic forming apparatus and the like wherein a mold, roll, or other unit whose temperature is to be controlled must be maintained at a temperature within prescribed limits. In the case of a mold or roll relatively close temperature limits must be held to assure proper and efficient forming of the material. Particularly in the case of a fluid cooled roll employed in the lamination of plastic film to plastic sheets the temperature is critical, since the roll should be maintained as hot as possible at a temperature just below the temperature which would cause the product to stick to the rolls. More specifically, the invention relates to temperature controlled fluid supply systems and certain novel and useful improvements therein.

Briefly, the invention in a preferred embodiment thereof relates to the heating and cooling of a part of a plastic material treating machine and, as illustrated, the apparatus is used in conjunction with a vacuum forming mold having a mold cavity, the mold being provided with one or more liquid receiving chambers surrounding the cavity through which a temperature controlling liquid such as water is continuously circulated.

Presently, many of the temperature controlled systems supplying a heat conductive fluid to molds and rolls are of the non-recirculating type wherein the fluid is simply supplied from an outside source and thence conveyed to a drain without being reused. Obviously, systems of this type unnecessarily consume an undue quantity of water or other heat conducting fluid and, further, are wasteful of power in that the temperature of the fluid supplied must usually in the first instance be heated to a certain predetermined minimum temperature. Further, in many areas, where only hard water is available, problems are encountered because it is impractical, usually, with a nonrecirculating system to soften the considerable quantities of water which must be used.

Another disadvantage of both nonrecirculating and recirculating temperature controlled systems in present use lies in their method of controlling the temperature of the heat conductive fluid supplied. Conventional systems employ thermostats to gauge the temperature of the fluid returning from the mold but these have proved relatively unsatisfactory and inefficient since they cause the system to tend to hunt if the mold gets overheated. Further, this concept of control is not at all directly responsive to the temperature of the fluid being supplied, which may be overheated or overcooled in the first place.

One of the prime objects of the instant invention is to provide a recirculating type temperature controlled system for plastic forming machiness and the like which includes heating means to initially heat a supply of water to a temperature which will determine the temperature of the mold and thence will maintain this temperature within fine limits on the order of a plus or minus 1.5° F. by controlling the temperature of the coolant or heat conductive fluid supplied to the mold or the like.

Another object of the invention is to provide a system of the character described which is also sensitive to the temperature of the reservoir of recirculating fluid.

A further object of the invention is to provide a temperature controlled system of this type which is compact and requires a relatively small amount of floor space, and which is simply constructed and can be economically manufactured and assembled.

A further object of the invention is to provide a recirculating type temperature controlled fluid supply apparatus which incorporates a safety feature preventing overheating of the reservoir of liquid if the circulating pump which forms an integrated part of the system should suddenly become inoperative.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings:
FIGURE 1 is a sectional, side elevational, schematic view of apparatus which is incorporated in my novel system.
FIGURE 2 is a sectional view taken on the line 2—2 of FIGURE 1.
FIGURE 3 is a sectional plan view taken on the line 3—3 of FIGURE 1.

Referring now more particularly to the accompanying drawings, in which I have shown a preferred embodiment of the invention, a letter S refers generally to my temperature controlled fluid supply system which includes a vertically elongate tank 10 connected by a conduit or line 11 to a mold 12, or a unit requiring temperature controlled heat conductive fluid. The vacuum forming mold 12 shown is of conventional design and includes a cooling chamber 13 adjacent the mold cavity 14. Preheated plastic sheet supplied to the mold is drawn into the cavity 14 by vacuum in pipe 15 which leads to a suitable apparatus for producing the vacuum condition.

The cooling chamber 13 provides a surrounding passageway which is capable of maintaining the mold at substantially a predetermined temperature. Heat added to the mold by the sheet is removed by the fluid circulating through the chamber which has fittings or unions 16 and 17 provided thereon. With some plastic forming apparatus or like units requiring temperature controlling fluid heat may be added by the fluid, of course.

The purpose of the instant unit is to maintain a steady mold temperature by providing a system which need only vary the temperature of a relatively small quantity of fluid when it may be necessary. Since the temperature of only a small quantity of fluid need be changed, the change can be accomplished rapidly.

Leading from the temperature controlling compartment 13 is a return line or conduit 18 which extends into tank 10 to a level somewhat below the normal level of water 19 maintained in the tank 10. Extending into the bottom portion of tank 10, which is mounted on wheels 20 so that it can be readily rolled into position in a processing line, is a tubular annular housing 21 which is closed except at its inner end 21a. The housing 21 which enters above the bottom of the tank has a portion 21b outside the tank 10 provided with a flange 22 adjacent the admitting opening 10a in the front wall of tank 10 which permits the housing to be secured in position in any acceptable manner. Preferably, a seal (not shown) will be interposed between the flange 22 and the front wall of housing 10 so that there is no possibility of the escape of fluid at the opening 10a.

Provided axially within the annular housing 21 is a continuous cooling element or pipe comprising a plurality of spirally arranged coils 23 which have a pipe section 23a supplying them with fluid from a suitable source and a pipe section 23b for returning the cooling fluid to the source or conveying it to a suitable drain. For the sake of convenience only, the source may be assumed to be the cold water tap to be found in any plant, and if this is the case the line 23b will then empty into a suitable drain.

Alternatively, of course, the coils 23 could be connected in any suitable conventional refrigeration system as the expansion stage thereof. Such a system would, of course, include the usual compressor, condenser, receiver, and coils 23 as the evaporator. Any suitable refrigerant such as Freon could be used. A conventional refrigeration system of the type referred to is illustrated in the patent to E. T. Williams, Re. 19,700. It will be observed that the lines 23a and 23b pass from the open end 21a of the housing at the rear of tank 10 back to the opposite side of the casing, so that the refrigerant therein will have some cooling effect on the water in tank 10. Lines 23a and 23b, as well as lines 11 and 18 are preferably flexible in character. Also mounted within housing 21 is a heating element 24 which extends from the section 21b of the housing axially relative to the coils 23 and is adapted to heat the water or other fluid proceeding through housing 21.

The line 11 supplying the mold 12 leads from the end 21b of housing 21, as at 11a, to pump 25 which is suitable for circulating the fluid in line 11 through the system. One pump which may be used is the Worthington Monobloc centrifugal pump, type DM, which has a mechanical seal. From the pump 25, which can be of ⅓ horsepower rating, the line 11 leads to a section 11b which extends horizontally into the tank 10, as shown, at a point above housing 21 but below the reservoir level 19 of fluid therein.

The portion 11b of line or conduit 11 has an opening 26 in its rear end admitting a bulb thermostat 27 which extends into the portion of section 11b which is within tank 10. The bulb 27 is an element of conventional bulb control apparatus, such as is manufactured by the Barber-Colman Company of Rockford, Illinois, which has the usual copper bulb connected by capillary tubing 28 with a brass bellows 29. The system 27, 28 and 29 is filled with the usual thermally responsive liquid which acts to expand or contract the bellows 29 with slight changes of temperature of bulb 27. A bulb system which can be employed to good advantage is that one designated No. JYDK 58B by the Barber-Colman Company.

The bellows 29 is pivotally connected at 30 to an electrically conductive bell crank lever 31 fulcrumed on a control shaft 32 which is movable axially when a dial 32a revolves. The threaded dial 32a is restrained from axial movement in either direction by a plate 33 which is secured to the control board 34, while the shaft 32 on which the dial is threaded is prevented from rotating by a nut 35 also mounted on the control board 35. Consequently, when dial 32a is revolved in either direction the shaft 32 will be adjusted axially and shaft 32 carries a trunnion 36 on which the bell crank 31 is fulcrumed. The bell crank 31 has a slot 37 through which trunnion 36 passes and in which trunnion 36 is slideably adjustable. Mounted on opposite sides of the upright arm 31a of the bell crank 31 are terminals 38 and 39 which are electrically connected to the cooling means 23 and the heater means 24 respectively to energize these elements in response to the temperature reported by bulb 27, if that temperature varies from the temperature for which the control is originally set.

Initially, of course, the control is set by the calibrated dial 32a to hold a predetermined temperature and so long as bulb 27 remains at that temperature the upright portion of bell crank 31 remains in neutral position out of contact with either terminal 38 or 39. Variance of the position of trunnion 36 either increases or decreases the distance the horizontal portion 31b of the bell crank must be swung upwardly to cause portion 31a to engage one of the terminals 38 or 39. Thus, if the permissible limits of temperature are exceeded either way one of the contacts 38 or 39 will be contacted and thus adjustment of shaft 32 and its trunnion 36 operates to set the upper and lower limits of the permissible temperature range.

Both the rod 29a which connects the bellows 29 with the bell crank lever 31 at 30, and the shaft 32 are insulated from the bell crank 31, which is connected to a power source 40 as shown. A line or wire 41 connects the conductive bell crank lever 31 with the power source 40 and a circuit wire 41a connects the power source 40 with the wire 42 leading to the heater element 24 and the circuit wire 43 leading to a conventional solenoid valve 44 which is opened when lever 31 engages terminal 38 to admit a fresh supply of coolant to the coils 23. A circuit wire 45 leads from the solenoid to terminal 38 and a wire 46 leads from the heater element 24 to terminal 39 as shown. Because the heater element 24 is arranged within coils 23 the housing 21 can be relatively small in diameter so that only a relatively small quantity of water is contacting the element 24 or coils 23.

In operation, assuming the tank 10 to be filled with water to the level 19 and the solenoid valve 44 to be closed, thus preventing the entrance of any additional fluid to line 23a which will be assumed to be filled with coolant, it will be initially necessary to heat the mold cavity 14 to the desired temperature when it is desired to put the mold into operation. Accordingly, bellows 29 will be in contracted position so that the upright portion 31a of bell crank 31 is clockwise of the position in which it is shown in FIGURE 1 in engagement with terminal 39. When switch 48 is closed to put the system in operation pump 25 is also started to continuously circulate the water in tank 10 through line 11 to the mold 12 which thence returns it to tank 10 through the return line 18. When the water passing through section 11b of the line 11 has been heated by the heater element 24 to a predetermined temperature, the bellows 29 has expanded sufficiently to move the portion 31a of lever 31 counterclockwisely sufficiently so that it is in the neutral position in which it is shown in FIGURE 1.

The heat added by the contact of the heated plastic sheet with the mold tends, of course, to increase the temperature of the mold 12 and accordingly the temperature of the water returning through line 18 will be increased. Accordingly, the temperature of the fluid in portion 11b of the supply line 11 will be increased and the bellows 29 will further expand. When it does so, it will move portion 31a of the lever 31 counterclockwisely into engagement with terminal 38 and this will cause solenoid valve 44 to open so that cold water will circulate through the line 23a, coils 23, and line 23b. When the temperature of the fluid in section 11b of line 11 has been decreased sufficiently, the resulting contraction of bellows 29 will, of course, return the electrically conductive lever 31 to neutral position.

With the arrangement disclosed it is impossible to operate the heating element 24 and cooling system simultaneously and further, because lever 37 has a neutral position spaced from the terminals 38 and 39 there is little tendency of the system to hunt. As previously noted, adjustment of the calibrated dial 32a varies the amount of contraction or expansion of bellows 29 necessary to cause lever 31 to contact either terminal 38 or 39. Because the bulb 27 is in a section of the line 11 outside of housing 21 all of the fluid contacting bulb 27 has been either warmed or cooled substantially as much as it will be warmed or cooled prior to the time it reaches vacuum mold 12. Any water reaching bulb 27 must pass through housing 21 which is of relatively restricted diameter so that it treats a small quantity of water. This it can accordingly do very rapidly so that the system is almost immediately responsive. Also, because the section 11b of line 11 extends through the tank 10 below the level of reservoir liquid 19, the bulb 27 may be termed "sensitive" to the temperature of the liquid in tank 10. Thus, if the pump should be deenergized or become inoperative while heater 24 was operating in tank 10 to heat the liquid in the tank, the tempature of the static water in the tank rising rapidly to a dangerous level would be reflected by bulb 27 in the static fluid in line 11 and the expansion of bellows 29 to cause lever 31 to move counterclockwisely away from terminal 39. If the bulb 27 were located in the return line 18 above the tank 10 while the pump was inoperative, the fact that the pump was inoperative would prevent any of the rapidly heating water from affecting the bulb system, of course. Thus, I have provided a system in which only the temperature of water or fluid which has passed through the cooling and heating elements 23 and 24 is measured but which is also sensitive to the temperature of the reservoir of liquid in tank 10. The system is particularly well suited to operate in the 80° F. to 250° F. range and will hold the temperature of the mold to a plus or minus 1.5° F.

It should be apparent that I have perfected a recirculating type, temperature controlled, fluid supply system of a practical design which will find wide use in the plastics industry where there is a substantial need for such a system. In certain of the claims the term "mold" is very broadly used to mean any kind of plastic forming element and, where like units are referred to, units are meant which likewise require a temperature controlled supply of fluid. While for purposes of illustration one form of this invention has been disclosed, other forms thereof may become apparent to those skilled in the art upon reference to this disclosure and therefore this invention is to be limited only by the scope of the appended claims.

I claim:

1. In apparatus including a material treating unit; a recirculating, temperature controlled fluid supply unit having a line leading to said material treating unit and a line leading from said material treating unit for respectively supplying a heat conductive fluid to said material treating unit and removing the same therefrom; said unit including a tank of relatively large capacity relative to said lines for accommodating a reservoir of fluid; an intermediate conduit of intermediate size relative to said line leading to said material treating unit and said tank for connecting the same; means in said intermediate conduit for varying the temperature of the fluid in said intermediate conduit; a portion of said line leading to said material treating unit extending through said tank and being immersed in the fluid therein; and means in said portion of the line leading to said material treating unit and remote from said intermediate conduit responsive to a change of temperature in the fluid in said line leading from the tank to the material treating unit and sensitive to a change of temperature in the fluid in the tank for operating said temperature varying means.

2. In a recirculating, temperature controlled fluid supply system for a material treating unit including a fluid supply line leading to the unit and a fluid return line from the said unit; a tank of enlarged capacity for holding a reservoir of fluid; conduit means within said tank forming a part of said fluid supply line; a pump for circulating said fluid to the unit; means in said conduit means in said tank for varying the temperature of the fluid in said tank; a portion of said line leading to said unit extending through said tank and being immersed in the fluid therein; and thermostat means in said portion of the line leading to the unit and remote from the conduit means within the tank responsive to a change of temperature in the fluid in the line leading to the unit and sensitive to a temperature change in the fluid in the tank for operating said temperature varying means.

3. In apparatus, including a material treating unit; a tank of relatively large capacity for holding a reservoir of heat conductive fluid; a line providing a passage for fluid from said tank to said unit; a return line providing a passage for fluid from said unit back to said tank; a pump in said first line for circulating the fluid in said tank to said unit, a portion of said line leading to said unit from said tank leading from said pump back through said tank and through the heat conductive fluid therein on its way to said unit; means in said tank remote from said portion of said line for varying the temperature of the fluid in said tank; and a temperature responsive bulb within the portion of said line leading back through said tank for controlling said temperature varying means in said tank.

4. In apparatus including a material treating unit; a tank of relatively large capacity for holding a reservoir of heat conductive fluid; a line leading to said unit from said tank and returning from said unit to said tank; a horizontally extending tubular housing in one portion of said tank open to said tank; a cooling system comprising continuous spiralling cooling coils in said housing arranged in axial parallelism; an elongate heater element extending within said coils; a control for operating one of said cooling system and heater element; a pump in the line leading to the unit; a portion of said line leading to the unit extending through the tank and being immersed in the fluid therein; and thermostat means in said portion of said line remote from said housing and sensitive to the reservoir of fluid in said tank and directly responsive to the temperature of the fluid in said line leading to the unit for actuating said control.

5. The combination defined in claim 4 in which said tubular housing extends into said tank from outside thereof and is closed except at its inner end; and said line to the unit leads from said end of the housing outside the tank to said pump and thence to said unit.

6. In a recirculating temperature controlled fluid supply system for a plastic mold or a like unit; a tank of relatively large capacity for holding a quantity of heat conductive fluid; conduit means leading from said tank to the mold and returning from the mold to the tank; pump means for circulating said fluid in the system; an elongate housing in one section of said tank interposed between the line leading from the tank to the mold and the line returning fluid to said tank providing a passageway for fluid to said line leading to the mold which is within the fluid body in the tank; a cooling member in said housing; a heating member in said housing; a control for operating either one or neither one of the cooling member and heating member, a portion of said line leading to the mold extending through the tank and being immersed in the fluid therein, and thermostat means in said portion of said line remote from said housing and directly responsive to the temperature of the fluid in the said portion of the line leading to the mold while sensitive to the temperature of the fluid in the tank for actuating said control.

7. In a recirculating temperature controlled fluid supply system for a plastic mold or a like unit; a tank of relatively large capacity for holding a quantity of heat conductive fluid; a line leading from said tank to the mold and returning from the mold to the tank; a pump outside the tank in the line leading from the tank to the mold for circulating said fluid; an elongate, horizontally disposed housing spaced above the bottom of said tank leading from outside of said tank substantially across the bottom thereof and having an open inner end; the line returning from said mold emptying into the tank at a point above said housing, said housing providing a restricted passageway for fluid to said line leading to the mold, which is surrounded by the fluid in the tank; a cooling system, including spirally arranged coils extending axially in said housing; a heating member in said housing within said coils; a control for said cooling member and heating member operable to actuate one of the cooling and heating members at a time; a line leading from the tank to the mold, having a portion leading from said pump through said tank above said housing on its way to said mold; and a thermostat bulb within said portion of the said line leading through the tank on its way to the mold so as to be effected both by the temperature of the fluid in said portion of the line and the fluid in said tank for actuating said control.

8. In apparatus, including a material treating unit; a recirculating temperature controlled fluid supply unit having a line leading to said treating unit and a line leading from said treating unit for respectively supplying a fluid to said treating unit and removing the same at a higher temperature; the fluid supply unit including a tank of relatively large capacity relative to said lines for accommodating a reservoir of fluid; an elongate housing of tubular configuration extending into said tank from outside said tank substantially across the bottom portion of said tank; said return line from the treating unit emptying into said tank at a point considerably above said housing, and said line leading from the tank to the treating unit leading out of the end of said housing outside said tank; a pump for circulating the fluid provided in said line leading from the tank to the treating unit, said line leading to the treating unit having a portion extending from said pump through said tank and the fluid therein above said housing on its way to said treating unit; spirally arranged cooling coils within said tubular housing and leading from said housing out of the open inner end of said tank; a heating element leading into the opposite end of said housing and extending through said coils; a control having a neutral position operating neither of said members and different positions operating each of the heating member and cooling member; and a thermostat bulb within said portion of the line leading from said tank to said treating unit which passes through said tank and the fluid therein connected to said control for actuating the same in response to the temperature of the fluid in said line leading to the treating unit and the temperature of the fluid body in said tank.

9. In a recirculating, temperature controlled, heat conductive fluid supply system for a material treating unit; a tank of relatively large capacity for holding a quantity of heat conductive fluid; a line leading from said tank to the unit requiring control and returning from the unit to the tank; circulating means for circulating fluid through said line; an elongate housing extending substantially across the lower portion of the tank and having an open inner end; the opposite end of the housing connecting with the portion of the line leading to the unit so that the housing provides a restricted passageway for fluid to said line leading to the unit; the line returning from said unit emptying into the tank at a point spaced above said housing; a cooling system in said housing; a heating member in said housing; a control for said cooling system and heating member operable to actuate one of the cooling system and heating member at a time; said line having a portion leading to the unit passing through said tank above said housing on its way to the said unit; and a thermostat member within said portion of the line passing through said tank so as to be affected both by the temperature of the fluid in said portion of the line and the fluid in said tank operating said control.

10. In a recirculating, temperature controlled, fluid supply apparatus for a material treating unit; a tank of relatively large capacity for holding a reservoir of heat conductive fluid; a line of relatively limited diameter providing a passage for fluid from said tank to said treating unit and returning to said tank; a pump for circulating the fluid in said tank through said line to said treating unit from said tank leading from outside said tank back through said tank and through the heat conductive fluid therein on its way to the treating unit; means in said tank remote from said portion of the line for varying the temperature of the fluid in said tank; and thermostat means within the portion of said line leading back through said tank for controlling said temperature-varying means in said tank.

References Cited in the file of this patent

UNITED STATES PATENTS

| | | |
|---|---|---|
| 1,723,082 | Schumann | Aug. 6, 1929 |
| 2,309,813 | Whiting | Feb. 2, 1943 |
| 2,483,021 | Oaks | Sept. 27, 1949 |
| 2,600,842 | Buecken | June 17, 1952 |
| 2,690,327 | Sardeson | Sept. 28, 1954 |
| 2,713,994 | Angelery | July 26, 1955 |
| 2,745,572 | Talbott | May 15, 1956 |
| 2,762,652 | Carter | Sept. 11, 1956 |